(12) United States Patent
Tsuru et al.

(10) Patent No.: US 10,192,294 B2
(45) Date of Patent: Jan. 29, 2019

(54) IMAGE PROCESSING APPARATUS AND IMAGE PROCESSING METHOD FOR DISPLAY MAPPING

(71) Applicant: Sony Corporation, Tokyo (JP)

(72) Inventors: Takumi Tsuru, Kanagawa (JP); Hiroaki Eto, Kanagawa (JP); Toshiya Hamada, Saitama (JP); Kenichi Kanai, Tokyo (JP); Tomizo Shiraishi, Kanagawa (JP)

(73) Assignee: Sony Corporation (JP)

( * ) Notice: Subject to any disclaimer, the term of this patent is extended or adjusted under 35 U.S.C. 154(b) by 75 days.

(21) Appl. No.: 14/913,875

(22) PCT Filed: Jul. 21, 2015

(86) PCT No.: PCT/JP2015/003638
§ 371 (c)(1),
(2) Date: Feb. 23, 2016

(87) PCT Pub. No.: WO2016/038775
PCT Pub. Date: Mar. 17, 2016

(65) Prior Publication Data
US 2016/0292834 A1 Oct. 6, 2016

(30) Foreign Application Priority Data

Sep. 8, 2014 (JP) ................................. 2014-182785

(51) Int. Cl.
*G06T 5/00* (2006.01)
*H04N 9/69* (2006.01)

(52) U.S. Cl.
CPC ............... *G06T 5/009* (2013.01); *H04N 9/69* (2013.01); *G06T 2200/28* (2013.01); *G06T 2207/20008* (2013.01); *G06T 2207/20208* (2013.01)

(58) Field of Classification Search
CPC ..................... G06T 5/009; G06T 5/007; G06T 2207/20208; G09G 2320/0276
See application file for complete search history.

(56) References Cited

U.S. PATENT DOCUMENTS 5,768,442 A 6/1998 Ahn
2012/0147953 A1 6/2012 El-Mahdy et al.
(Continued)

FOREIGN PATENT DOCUMENTS

EP         1845704 A2 * 10/2007 ............... H04N 1/60
JP     2007257641 A     10/2007
(Continued)

OTHER PUBLICATIONS

Fogg (Harmonic) C et al: "Indication of SMPTE 2084, 2085 and carriage of 2086 metadata in HEVC", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctv-site/,, No. JCTVC-P0084-v2, Jan. 14, 2014 (Jan. 14, 2014), XP030115562.
(Continued)

*Primary Examiner* — Brian Werner
(74) *Attorney, Agent, or Firm* — Lerner, David, Littenberg, Krumholz & Mentlik, LLP

(57) ABSTRACT

An image processing apparatus and an image processing method which can transmit/receive or display a high-dynamic-range image suitably are provided. An image transmission apparatus transfers, as metadata of content, luminance conversion information, which is for conversion of HDR content (for example, with maximum luminance 2000 nit) into SDR content (having, for example, 100 nit), or differential information. Based on the metadata, an image reception apparatus generates luminance conversion information, in which received HDR content is adapted to a capability of a display (for example, with maximum luminance 500 nit or 1000 nit) in an output destination, and realizes display mapping which is not against an intention of a producer.

19 Claims, 14 Drawing Sheets

(56) References Cited

U.S. PATENT DOCUMENTS

| | | | |
|---|---|---|---|
| 2013/0229546 A1* | 9/2013 | Furumura | G06T 3/4038 348/229.1 |
| 2014/0078165 A1 | 3/2014 | Messmer et al. | |
| 2014/0082104 A1 | 3/2014 | Mann | |
| 2015/0010059 A1 | 1/2015 | Hattori et al. | |
| 2015/0281707 A1 | 10/2015 | Messmer et al. | |
| 2015/0358646 A1 | 12/2015 | Mertens | |

FOREIGN PATENT DOCUMENTS

| | | | |
|---|---|---|---|
| JP | 2014-502480 A | 1/2014 | |
| WO | 2012-166382 A2 | 12/2012 | |
| WO | 2013046095 A1 | 4/2013 | |
| WO | 2013059116 A1 | 4/2013 | |
| WO | 2014002901 A1 | 1/2014 | |
| WO | 2014-128586 A1 | 8/2014 | |
| WO | 2014130343 A2 | 8/2014 | |

OTHER PUBLICATIONS

International Search Report from International Publication PCT/JP2015/003638 dated Sep. 24, 2015.

Segall A et al: "Tone Mapping SEI", 19. JVT Meeting; Mar. 31, 2006-Jul. 4, 2006;.Geneva, CH; (Joint Videoteam of ISO/IEC JTC1/SC29/WG11 and ITU-T SG.16 ), No. JVT-S087, Apr. 1, 2006 (Apr. 1, 2006), XP030006466, ISSN: 0000-0409.

Fogg (Harmonic) C et al: "Indication of SMPTE 2084, 2085 and carriage of 2086 metadata in HEVC", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0084-v2, Jan. 14, 2014 (Jan. 14, 2014), XP030115562.

Singapore Examination Report for Application No. 11201601305W dated Oct. 26, 2017, 5 pages.

Reasons for Refusal for 361848JP00 (Application No. 2014182785) dated Feb. 20, 2018.

Hattori, et al., "HLS: SEI message for Knee Function Information," Joint Collaborative Team on Video Coding (JCT-VC) of ITU-T SG 16 WP 3 and ISO/IEC JTC 1/SC 29/wg 11, 16th Meeting San Jose, CA. US, Jan. 9-17, 2014.

Reasons for Refusal for 361848JP00 (Application No. 2014182785) dated Jul. 3, 2018.

* cited by examiner

FIG. 8

| knee_function_info(payloadSize){ | Descriptor |
|---|---|
| 801 — knee_function_id | ue(v) |
| 802 — knee_function_cancel_flag | u(1) |
| if(!knee_function_cancel_flag){ | |
| 803 —   knee_function_persistence_flag | u(1) |
| 804 — input_d_range | u(32) |
| 805 —   input_disp_luminance | u(32) |
| 806 — output_d_range | u(32) |
| 807 —   output_disp_luminance | u(32) |
| 808 — num_knee_points_minus1 | ue(v) |
| 810 —   for(i=0; i<=num_knee_points_minus1; i++){ | |
| 811 —     input_knee_point[i] | u(10) |
| 812 —     output_knee_point[i] | u(10) |
| } | |
| } | |
| } | |

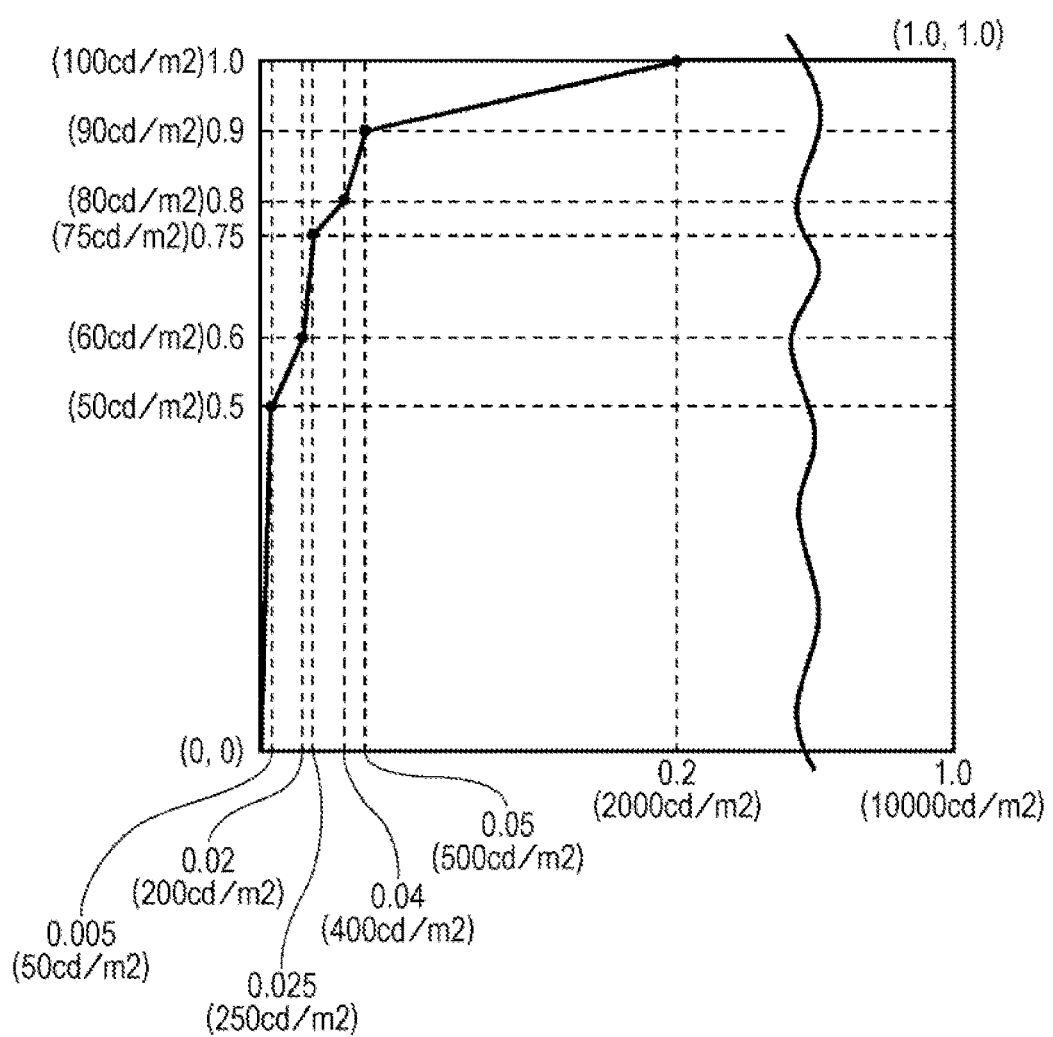

FIG. 10

| Tone_mapping_info(payloadSize){ | Descriptor |
|---|---|
| tone_map_id | ue(v) |
| tone_mapping_cancel_flag | u(1) |
| if(!tone_mapping_cancel_flag){ | |
|   tone_mapping_persistence_flag | u(1) |
|   coded_data_bit_depth | u(8) |
|   target_bit_depth | u(8) |
|   tone_map_model_id | ue(v) |
|   if(tone_map_model_id==0){ | |
|     min_value | u(32) |
|     max_value | u(32) |
|   } else if(tone_map_model_id==1){ | |
|     sigmoid_midpoint | u(32) |
|     sigmoid_width | u(32) |
|   } else if(tone_map_model_id==2){ | |
|     for(=0;i<(1<<target_bit_depth);i++){ | |
|       start_of_coded_interval[i] | u(v) |
|   } else if(tone_map_model_id==3){ | |
|     num_pivots | u(16) |
|     for(i=0;i<num_pivots;i++){ | |
|       coded_pivot_value[i] | u(v) |
|       target_pivot_value[i] | u(v) |
|   } else if(tone_map_model_id==4){ | |
|     camera_iso_speed_idc | u(8) |
|     if(camera_iso_speed_idc==EXTENDED_ISO){ | |
|       camera_iso_speed_value | u(32) |
|     exposure_index_idc | u(8) |
|     if(exposure_index_idc==EXTENDED_ISO){ | |
| ···(REST IS OMITTED) | |
| } | |

1000

1001 coded_data_bit_depth
1002 target_bit_depth
1003 tone_map_model_id
1004 num_pivots
1005 coded_pivot_value[i]
1006 target_pivot_value[i]

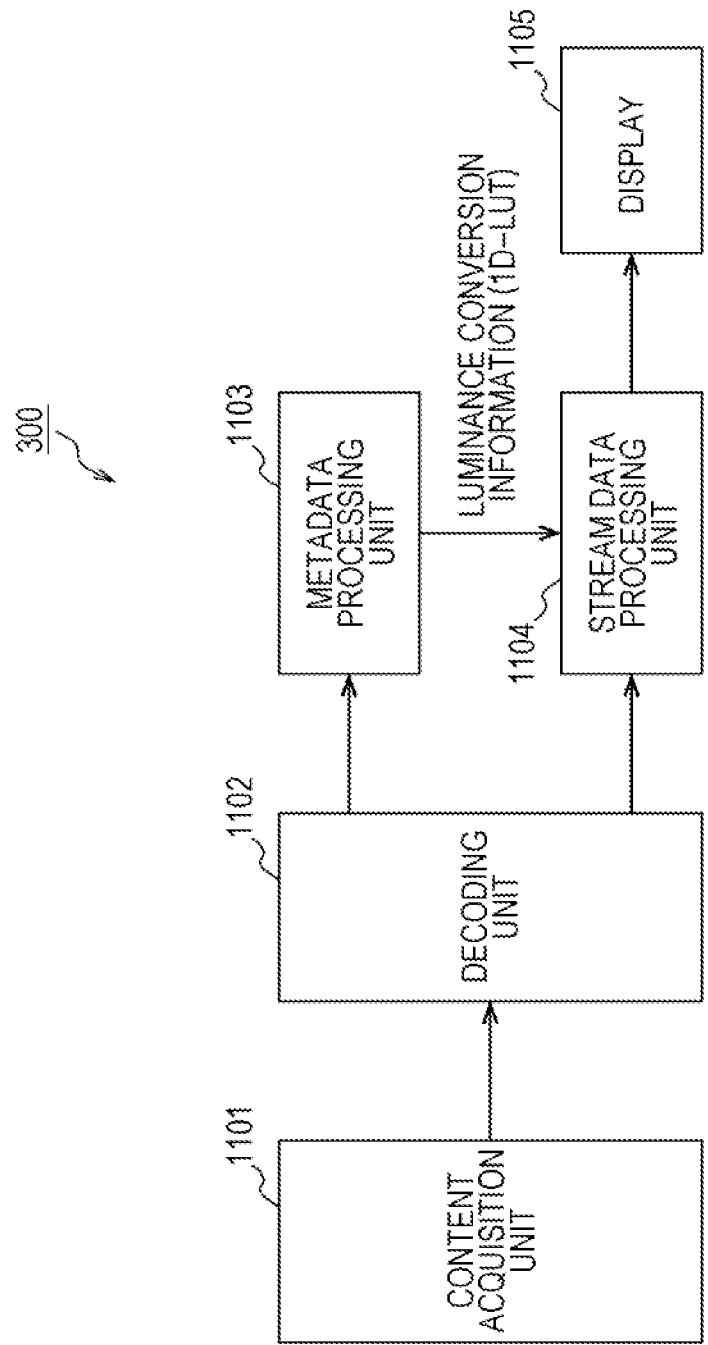

IMAGE PROCESSING APPARATUS AND IMAGE PROCESSING METHOD FOR DISPLAY MAPPING

CROSS-REFERENCE TO RELATED APPLICATIONS

This application is a national phase entry under 35 U.S.C. § 371 of International Application No. PCT/JP2015/003638 filed Jul. 21, 2015, which claims the benefit of Japanese Priority Patent Application No. JP 2014-182785, filed in the Japanese Patent Office on Sep. 8, 2014, the entire contents of which are incorporated herein by reference.

TECHNICAL FIELD

A technology disclosed in the present description relates to an image processing apparatus and an image processing method which are for processing image information. Specifically, the technology relates to an image processing apparatus and an image processing method which are for transmitting/receiving or displaying a high-dynamic-range image.

BACKGROUND ART

Recently, the number of bits of an imaging element (image sensor) is increased and an image comes to be in a dynamic range. Generally, a dynamic range of an image can be expressed by a ratio between minimum luminance and peak luminance. In an HDR image, a contrast ratio between a color with a maximum color value and a color with a minimum color value is, for example, 10000:1 or higher. Thus, the HDR image can express an actual world realistically. The HDR image can record luminance in a whole visible range and can support a dynamic range and a color gamut which are equivalent to those of a visual characteristic of a human. The HDR image has an advantage that shading can be expressed realistically, exposure can be simulated, and brightness can be expressed.

As described above, while an HDR image is photographed on a content production side, displays with various kinds of performance such as a display corresponding to a standard dynamic range (SDR) which is compressed into about one fortieth of the dynamic range and a display, peak luminance of which is 500 nits or 1000 nits and which corresponds to an HDR, are used in houses in which content is viewed. Thus, processing to adapt a dynamic range of original content to performance of a display in an image output destination (hereinafter, also referred to as "display mapping") is necessary (see, for example, Patent Literature 1).

However, in the display mapping, when conversion of a dynamic range is performed simply by linear scaling, it is concerned that a great amount of information is lost and a visual effect, which is seen by a human, of an image becomes greatly different before and after the conversion. Such a loss of information is not intended by a content producer.

SUMMARY

Technical Problem

It is desirable to provide a superior image processing apparatus and image processing method which can transmit/receive or display a high-dynamic-range image suitably.

Solution to Problem

The present application is provided in view of the forgoing.

According to an embodiment of the disclosure, an image processing apparatus may include circuitry configured to: generate, based on metadata including luminance conversion information and a capability of a display in an output destination, second luminance conversion information for adaptation of content in a first dynamic range to the display; and process the content in the first dynamic range based on the second luminance conversion information.

According to an embodiment of the disclosure, an image processing method may include generating, by a processing device, based on metadata including luminance conversion information and a capability of a display in an output destination, second luminance conversion information for adaptation of content in a first dynamic range to the display; and processing, by the processing device, the content in the first dynamic range based on the second luminance conversion information.

According to an embodiment of the disclosure, an image processing apparatus may include circuitry configured to: acquire luminance conversion information for conversion of content in a first dynamic range into content in a second dynamic range, and generate metadata of content based on the luminance conversion information, in which the luminance conversion information is based on an intension of a content producer for use in display mapping.

According to an embodiment of the disclosure, an image processing method may include information acquiring, by a processing device, to acquire luminance conversion information for conversion of content in a first dynamic range into content in a second dynamic range; and metadata generating, by the processing device, to generate metadata of content based on the luminance conversion information, in which the luminance conversion information is based on an intension of a content producer for use in display mapping.

According to an embodiment of the present technology, an image processing apparatus includes: an information acquisition unit configured to acquire luminance conversion information for conversion of content in a first dynamic range into content in a second dynamic range; and a metadata generation unit configured to generate metadata of content based on the luminance conversion information.

According to an embodiment of the present technology, the metadata generation unit of the image processing apparatus is configured to generate the metadata including a relationship between luminance values before and after conversion from the first dynamic range into the second dynamic range at one or more points.

According to an embodiment of the present technology, the image processing apparatus further includes a transmission unit configured to transmit the metadata while storing the metadata in a predetermined transmission container.

According to an embodiment of the present technology, the transmission unit of the image processing apparatus is configured to transmit the metadata expressing luminance conversion information in a linear luminance value.

According to an embodiment of the present technology, the transmission unit of the image processing apparatus is configured to store the metadata into knee_function_info SEI of the content.

According to an embodiment of the present technology, the transmission unit of the image processing apparatus is configured to transmit the metadata expressing luminance conversion information in a code value.

According to an embodiment of the present technology, the transmission unit of the image processing apparatus is configured to store the metadata into Tone_mapping_info SEI of the content.

Also, according to an embodiment of the present technology, an image processing apparatus includes: a metadata processing unit configured to generate, based on metadata including luminance conversion information for conversion of content in a first dynamic range into content in a second dynamic range, second luminance conversion information for adaptation of the content in the first dynamic range to a display in an output destination; and a content processing unit configured to process the content in the first dynamic range based on the second luminance conversion information.

According to an embodiment of the present technology, the metadata processing unit of the image processing apparatus is configured to generate a conversion table to convert a luminance value in the first dynamic range into a luminance value in the display with a predetermined peak luminance based on the metadata including a relationship between luminance values before and after conversion from the first dynamic range into the second dynamic range at one or more points, and the content processing unit is configured to convert luminance of the content in the first dynamic range based on the conversion table.

According to an embodiment of the present technology, the metadata processing unit of the image processing apparatus is configured to generate the second luminance conversion information based on metadata stored in a predetermined transmission container.

According to an embodiment of the present technology, the metadata processing unit of the image processing apparatus is configured to generate the second luminance conversion information based on the metadata expressing luminance conversion information in a linear luminance value, and the content processing unit is configured to perform processing with respect to a luminance signal, on which electro-optical linear conversion processing is performed, based on the second luminance conversion information.

According to an embodiment of the present technology, the metadata processing unit of the image processing apparatus is configured to generate the second luminance conversion information based on metadata stored in knee_function_info SEI of the content.

According to an embodiment of the present technology, the metadata processing unit of the image processing apparatus is configured to generate the second luminance conversion information based on the metadata expressing luminance conversion information in a code value, and the content processing unit is configured to perform processing with respect to a luminance code value, on which electro-optical linear conversion processing is performed, based on the second luminance conversion information.

According to an embodiment of the present technology, the metadata processing unit of the image processing apparatus is configured to generate the second luminance conversion information based on metadata stored in Tone_mapping_info SEI of the content.

According to an embodiment of the present technology, when peak luminance of the display is higher than peak luminance of the first dynamic range, the metadata processing unit of the image processing apparatus is configured not to generate the second luminance conversion information and not to make the content processing unit perform processing of the content in the first dynamic range.

Also, according to an embodiment of the present technology, an image processing method includes: information acquiring to acquire luminance conversion information for conversion of content in a first dynamic range into content in a second dynamic range; and metadata generating to generate metadata of content based on the luminance conversion information.

Also, according to an embodiment of the present technology, an image processing method includes: metadata processing to generate, based on metadata including luminance conversion information for conversion of content in a first dynamic range into content in a second dynamic range, second luminance conversion information for adaptation of the content in the first dynamic range to a display in an output destination; and content processing to process the content in the first dynamic range based on the second luminance conversion information.

Advantageous Effects of Invention

According to a technology disclosed in the present description, a superior image processing apparatus and image processing method which suitably provide information related to luminance conversion of an image or which can suitably perform dynamic range conversion of an image based on provided information related to luminance conversion can be provided.

Note that an effect described in the present description is just an example and an effect of the present technology is not limited thereto. Also, there is a case where the present technology has an additional effect other than the above-described effect.

A further different object, characteristic, or advantage of the technology disclosed in the present description will be understood in a detail description based on an embodiment or attached drawings described later.

BRIEF DESCRIPTION OF DRAWINGS

FIG. 8 is a view illustrating a syntax example 800 of dynamic range conversion determination information "knee_function_info SEI".

FIG. 9 is a view illustrating, as dynamic range conversion information, a parameter setting example illustrated in a table 1.

FIG. 10 is a view illustrating a syntax example 1000 of tone mapping information "Tone_mapping_Info SEI".

FIG. 11 is a view illustrating a functional configuration to process HDR content based on metadata of luminance conversion information (1D-LUT).

DESCRIPTION OF EMBODIMENTS

In the following, an embodiment of a technology disclosed in the present description will be described in detail with reference to the drawings.

Figure 1:
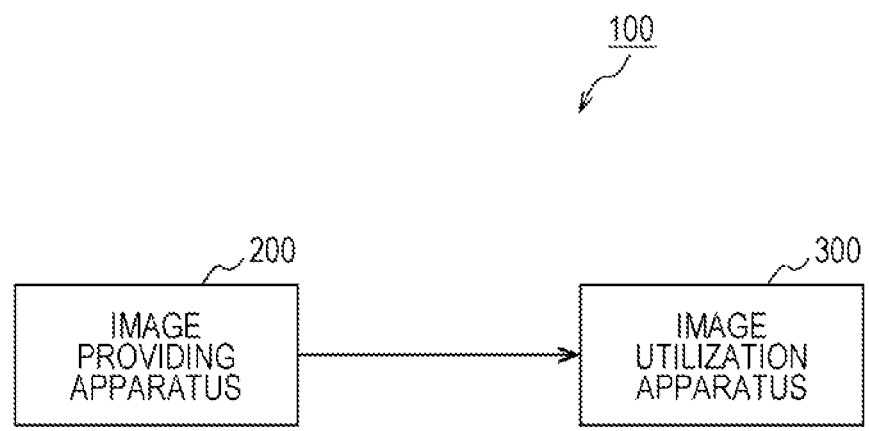
FIG. 1 is a view schematically illustrating a configuration of an image providing system 100 to which a technology disclosed in the present description is applied.

In FIG. 1, a configuration of an image providing system 100 to which a technology disclosed in the present description is applied is illustrated schematically. The illustrated image providing system 100 includes the image providing apparatus 200 to provide an image stream and an image utilization apparatus 300 to acquire an image stream and to perform display output of the image stream.

When the image providing system 100 is applied to a recording/reproduction system such as an ultra high definition-Blu-ray (registered trademark) disc (UHD-BD), the image providing apparatus 200 is on a side of a content producer. The image utilization apparatus 300 is a combination of a medium reproduction apparatus such as a BD player and a display to perform display output of a reproduced image. In the image providing system 100 such as an UHD-BD, an uncompressed reproduced stream is transmitted from a BD player to a display through a high definition multimedia interface (HDMI) (registered trademark).

Alternatively, when the image providing system 100 is applied to an Internet distribution service such as an over the top (OTT), the image providing apparatus 200 is on a side of a content producer and provides produced content on a streaming server. On the other hand, the image utilization apparatus 300 is a client including a multifunctional terminal such as a personal computer, a smartphone, or tablet to receive stream data of content from a streaming server. Also, when the image providing system 100 is applied to a digital broadcasting service, the image providing apparatus 200 is a broadcast station and the image utilization apparatus 300 is a television or the like provided in a house. For example, in an Internet distribution service or a broadcasting service, content is transmitted as an encoded stream such as a moving picture experts group 2 transport stream (MPEG2 TS) from a server to a client or from a broadcast station to a television.

In various industries which provide image content such as a UHD-BD, an Internet distribution service, or broadcasting, dynamic range expansion of a luminance component and an HDR technology with broad contrast are expected in addition to a 4K resolution technology of an element of high resolution content. According to the HDR technology, luminance in a whole visible range can be recorded and a dynamic range and a color gamut equivalent to those of a visual characteristic of a human can be supported. Also, in a display industry, a product including a function corresponding to dynamic range expansion of a luminance component comes to be produced. For example, a liquid crystal display using a direct light emitting diode (LED) can reproduce brightness of light faithfully and can realize image expression with high luminance.

Figure 2:
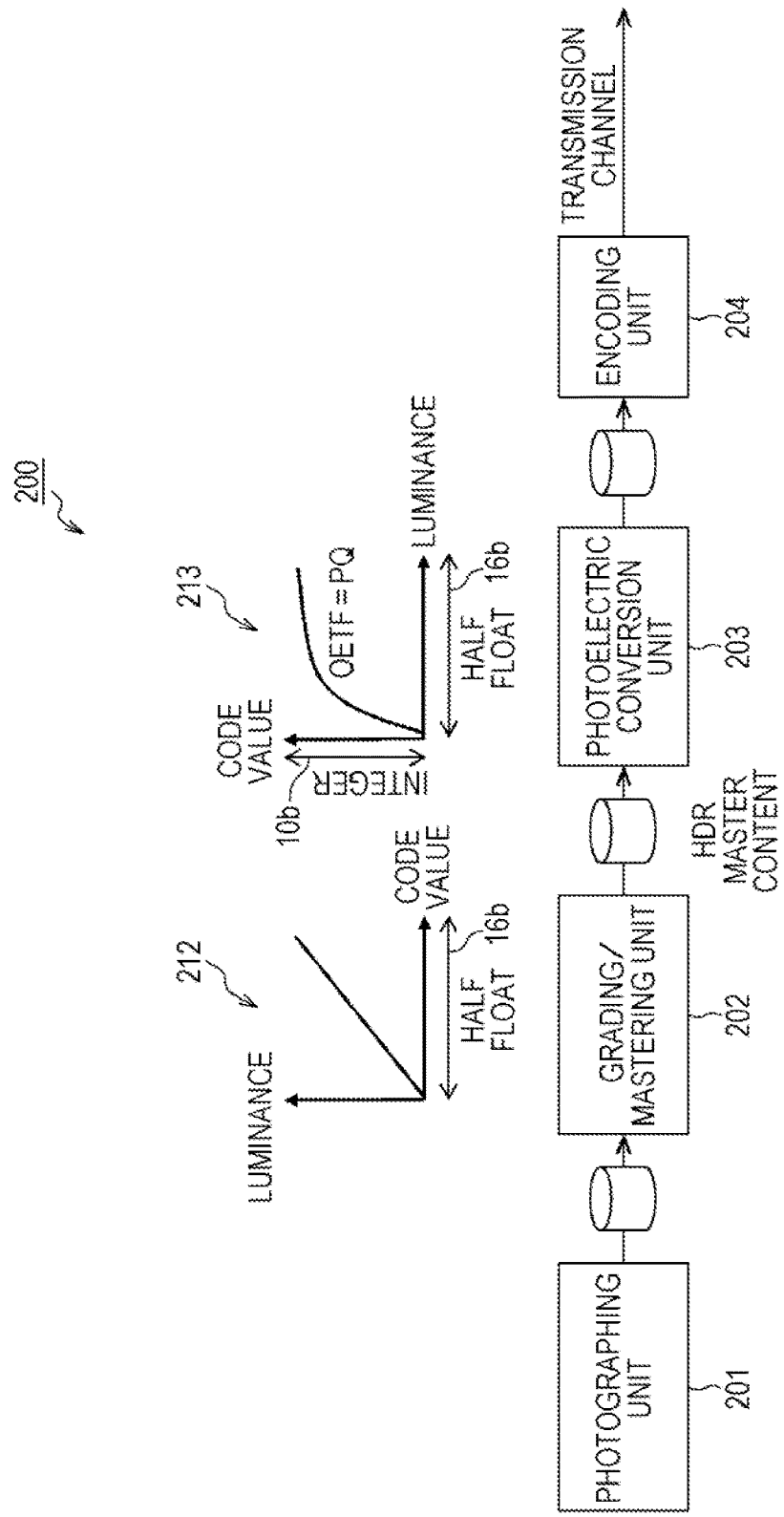
FIG. 2 is a view schematically illustrating a workflow in which HDR content is processed on a side of an image providing apparatus 200 (or content production side).

In FIG. 2, a workflow in which HDR content is processed on a side of the image providing apparatus 200 (or content production side) is schematically illustrated.

A photographing unit 201, for example, includes a 4K camera and records a color image in a wide color gamut color system based on the ITU-R Recommendation BT.2020.

Then, in a grading/mastering unit 202, HDR master content is generated by performing grading or mastering processing with respect to photographed content and converting a code value into a linear luminance signal by using a conversion table such as what is indicated by a reference number 212. With respect to the HDR master content, metadata generation processing is performed. In the present embodiment, as metadata, luminance conversion information useful for display mapping is generated. A detail of the metadata will be described later.

Then, a photoelectric conversion unit 203 converts luminance into a code value having 10 bits by using an OETF conversion table, such as what is indicated by a reference number 213, and converts an optical linear luminance signal of the HDR master content into a panel drive signal.

An encoding unit 204 encodes the HDR master content and metadata thereof and generates a stream in a predetermined encode format such as the moving picture experts group-2 transport stream (MPEG-2 TS). Then, the generated encoded stream is transmitted from a transmission interface (not illustrated) toward the image utilization apparatus 300.

Figure 3:
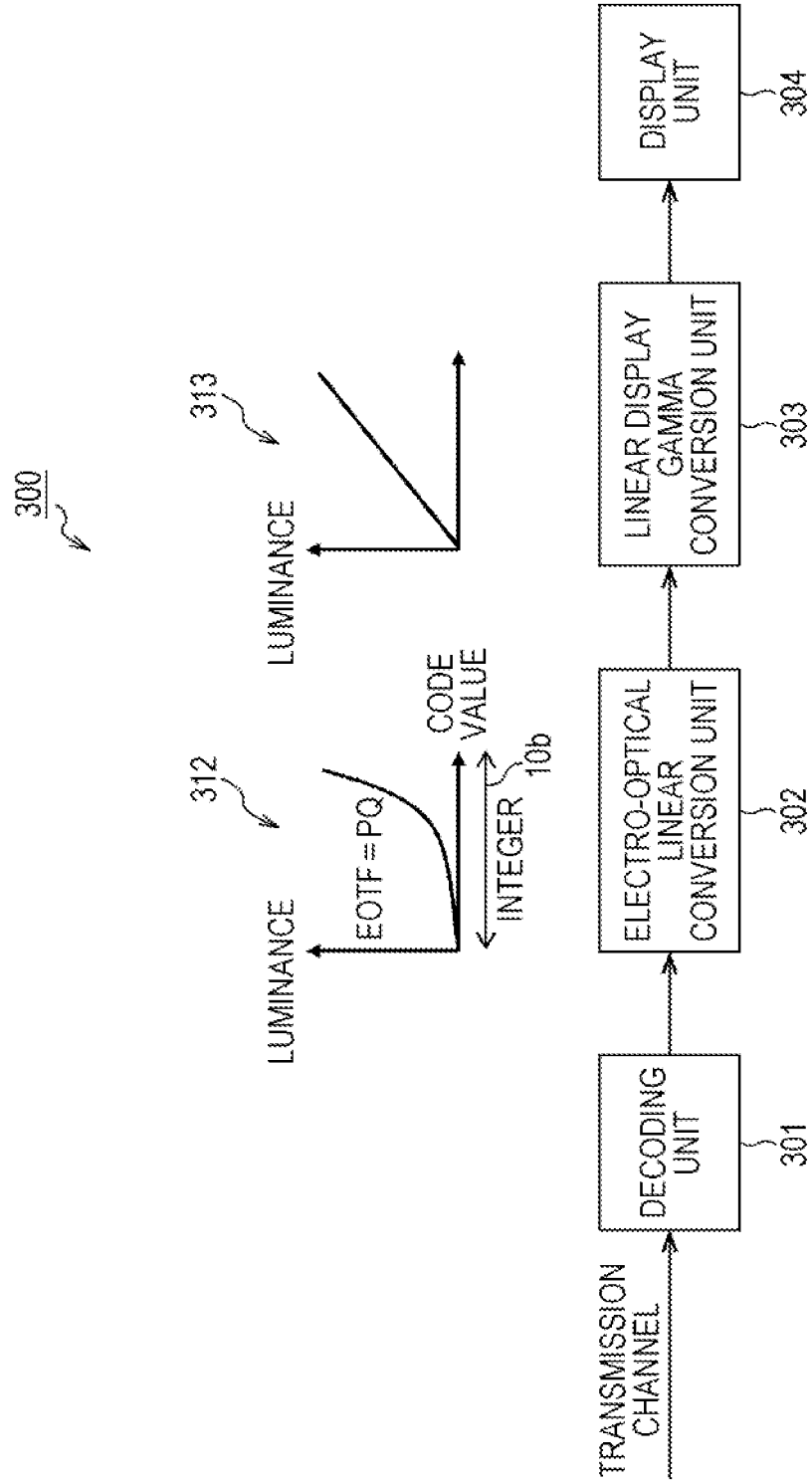
FIG. 3 is a view schematically illustrating a workflow in which HDR content is processed on a side of an image utilization apparatus 300.

In FIG. 3, a workflow in which HDR content is processed on a side of the image utilization apparatus 300 is schematically illustrated.

A decoding unit 301 performs processing to decode the encoded stream, which is provided from the image providing apparatus 200, into original content (panel drive signal) and extracts metadata.

Then, an electro-optical linear conversion unit 302 converts the decoded panel drive signal including code values of 10 bits into an optical linear luminance signal by using an EOTF conversion table indicated by a reference number 312.

Note that in the present embodiment, based on luminance conversion information described in metadata, dynamic range conversion (display mapping) processing of a luminance signal is performed. According to a transmission method of metadata, the display mapping processing is applied to either of a code value before EOTF conversion or an optical linear luminance signal after the EOTF conversion. A detail of the display mapping will be described later.

The, a linear display gamma conversion unit 303 performs gamma processing with respect to a luminance signal by using a linear conversion table indicated by a reference number 313 and performs conversion into a panel drive signal adapted to an input characteristic of a display panel. Then, a display unit 304 including a liquid crystal display panel or the like performs driving according to the panel drive signal and displays content on a screen.

When an HDR technology is applied in the image providing system 100, a case where a dynamic range of the image providing apparatus 200 and that of the image utilization apparatus 300 are not identical to each other is concerned. For example, content with peak luminance 2000 nits is stored into a Blue-ray disc and is distributed from the side of the image providing apparatus 200. However, on the side of the image utilization apparatus 300, there is a case where an HDR display having peak luminance around 500 nits or 1000 nits is included and it is not possible to correspond to peak luminance of reproduced content.

In such a case, on the side of the image utilization apparatus 300, it is preferable that dynamic range conversion is performed with respect to an image provided by the image providing apparatus 200 and that display mapping for adaptation to performance (peak luminance) of a display in an output destination is performed. However, conversion of a dynamic range is performed simply by linear scaling (equally in all luminance level) in the display mapping, a great amount of information is lost and a visual effect, which is seen by a human, of an image becomes greatly different before and after the conversion. Such a loss of information is not intended by a content producer.

Thus, inventors of the present technology consider that establishment of a production workflow of HDR content is necessary in addition to provision of HDR content on a production side or on the side of the image providing apparatus 200 and inclusion of a display, which corresponds to an HDR, on the side of the image utilization apparatus 300 in order to build a world in the HDR in the image providing system 100.

Also, it is necessary not to lose an intension of a content producer when dynamic range conversion of an HDR image is performed by display mapping on the side of the image utilization apparatus 300 or the like.

Thus, instead of simple linear scaling, an intension of a content producer is provided as metadata associated with an image stream in the technology disclosed in the present disclosure.

More specifically, on the side of the image providing apparatus 200, luminance conversion information, which is acquired in an operation in which a content producer performs conversion processing of HDR content into SDR content, or differential information between the HDR content and the SDR content is treated as an intention of the producer which intension is useful for display mapping and is transmitted as metadata of content.

On the other hand, on the side of the image utilization apparatus 300, when display mapping of the HDR content (for example, with peak luminance 2000 nit) provided by the image providing apparatus 200 is performed on a display (for example, with peak luminance 500 nit or 1000 nit) to be an output destination, by generating luminance conversion information corresponding to a capability of a display based on the luminance conversion information received as the metadata, appropriate luminance expression which is not against an intension of a producer can be realized even after the display mapping.

Figure 4:
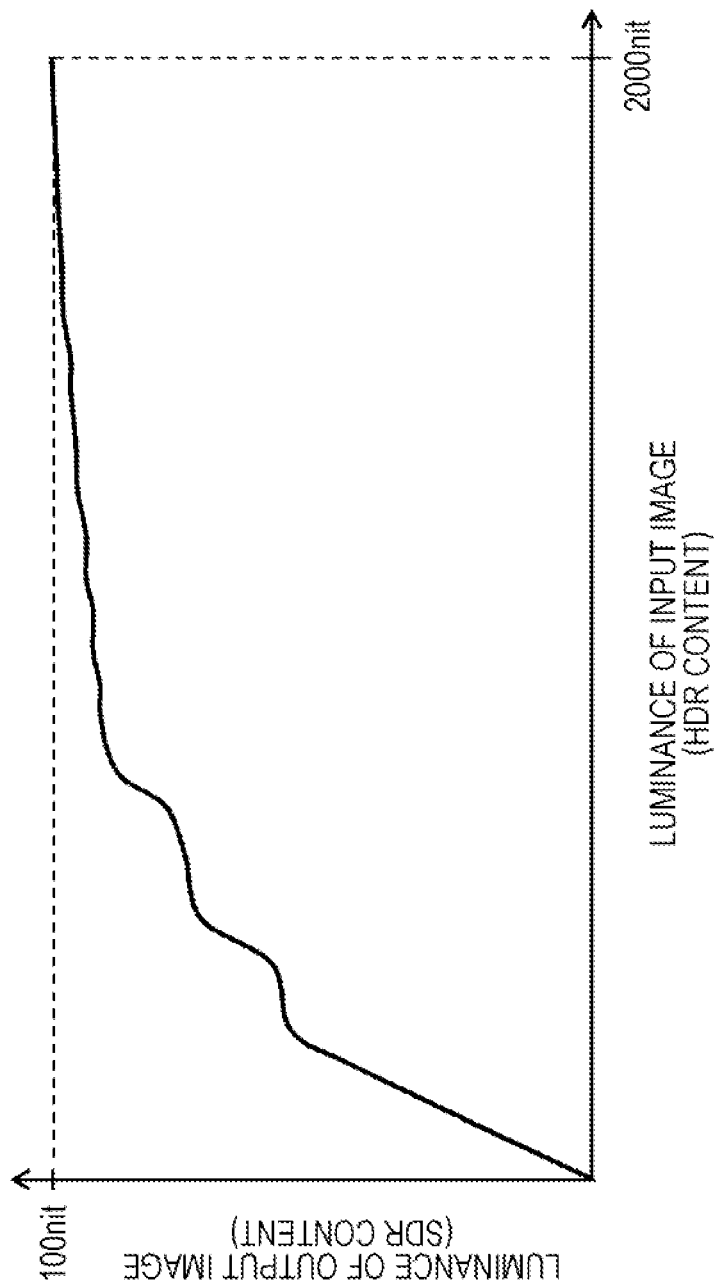
FIG. 4 is a view illustrating an example of luminance conversion information of conversion from HDR content having peak luminance 2000 nits into SDR content having peak luminance 100 nits.

In FIG. 4, an example of luminance conversion information for generation of SDR content having peak luminance 100 nits from HDR content having peak luminance 2000 nits is illustrated. In the same drawing, a horizontal axis is luminance of HDR content as input luminance and a vertical axis is luminance of SDR content as output luminance.

For example, a content producer performs conversion processing of produced HDR content into SDR content in an authoring flow of content using a master display. As log data of the authoring flow, information such as what is illustrated in FIG. 4 can be acquired. For example, first, content in a HDR is produced for a medium with high recording density such as a Blue-ray disc. However, SDR content is often generated from the produced HDR content for distribution through a medium with lower recording density or distribution in a transmission channel in a narrow band. Of course, luminance conversion information similar to what is illustrated in FIG. 4 can be acquired not as log data in the authoring flow but from differential information between produced HDR content and produced SDR content. A method itself to acquire luminance conversion information such as what is illustrated in FIG. 4 is not particularly limited.

Luminance conversion information of when a producer generates SDR content from HDR content or luminance conversion information calculated from a relationship between HDR content and SDR content reflects an intension of the producer with respect to luminance conversion of HDR content (into SDR content).

With reference to FIG. 4, linear luminance conversion processing is performed up to a vicinity of 500 nits of HDR content on an input side. For example, this corresponds to a luminance level equal to or lower than white luminance (diffuse white luminance) to be a basis in an image or a scene and an intension of a content producer that luminance information is to be kept even after the luminance conversion can be assumed. Also, in a region exceeding 500 nits of the HDR content on the input side, a degree of compression becomes gradually greater. Thus, an intension of the content producer that luminance information is not necessarily kept (can be compressed) in a region of high luminance can be assumed.

In the image providing system 100 according to the present embodiment, luminance conversion information from HDR content into SDR content is set in a format of a one-dimensional look-up table (1D-LUT) and is transferred as metadata from the image providing apparatus 200 to the image utilization apparatus 300.

As a method to transmit metadata of the luminance conversion information (1D-LUT) indicating an intension of the content producer, for example, there is a method to use supplemental enhancement information (SEI), which is already defined in the MPEG, as a transmission container or a method to newly define SEI to be a container to transmit luminance conversion information is considered. Also, in a case of an image providing system to record content into a Blue-ray disc for distribution, a method to store luminance conversion information into a database file in the Blue-ray disc is considered other than the above-described method to use SEI as a transmission container.

Luminance conversion information indicating an intension of a content producer is a 1D-LUT in which a correspondence relationship between luminance of original HDR content and luminance of SDR content after luminance conversion. As illustrated in FIG. 4, the 1D-LUT in which luminance values of SDR content which values correspond to all luminance values of HDR content are described may be used as metadata. However, since an amount of metadata becomes massive, a 1D-LUT only describing a correspondence relationship between a luminance value of HDR content and that of SDR content of the predetermined number of points may be used as metadata.

Figure 5:
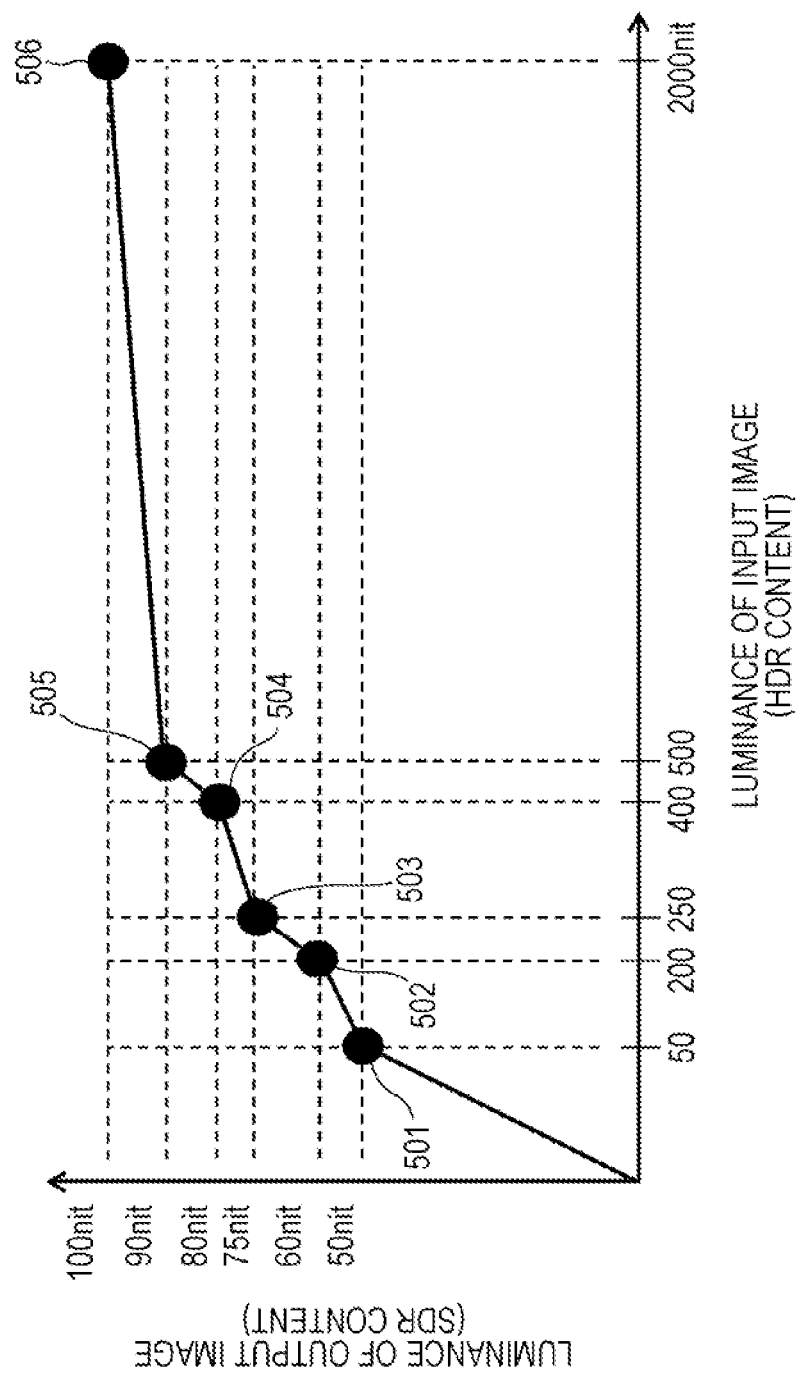
FIG. 5 is a view illustrating an example of a 1D-LUT in which luminance conversion information from the HDR content into the SDR content which information is illustrated in FIG. 4 is thinned to six points.

In FIG. 5, an example of an 1D-LUT in which the luminance conversion information from HDR content into SDR content which information is illustrated in FIG. 4 is thinned to six points indicated by reference numbers 501 to 506 is illustrated. Luminance conversion information between points can be calculated, for example, by linear calculation from an inclination between points. Of course, luminance conversion information between points may be interpolated not by the linear calculation but by nonlinear calculation.

Here, with respect to a point describing luminance conversion information in the 1D-LUT, for example, a characteristic point (such as point where inclination of curved line changes suddenly) may be automatically extracted by calculation from a curved line (see FIG. 4) of the luminance conversion information from HDR content into SDR content. Alternatively, a content producer may designate, in an authoring flow, a point (luminance level) to be described in the 1D-LUT. Alternatively, a luminance level (such as 50 nit and 500 nit) of the predetermined number of points to be described in the 1D-LUT may be previously defined.

On the side of the image utilization apparatus 300, in a case of performing display mapping of HDR content, which is provided by the image providing apparatus 200, on a display to be an output destination, luminance conversion information corresponding to a capability of a display is generated based on luminance conversion information received as metadata.

Figure 6:
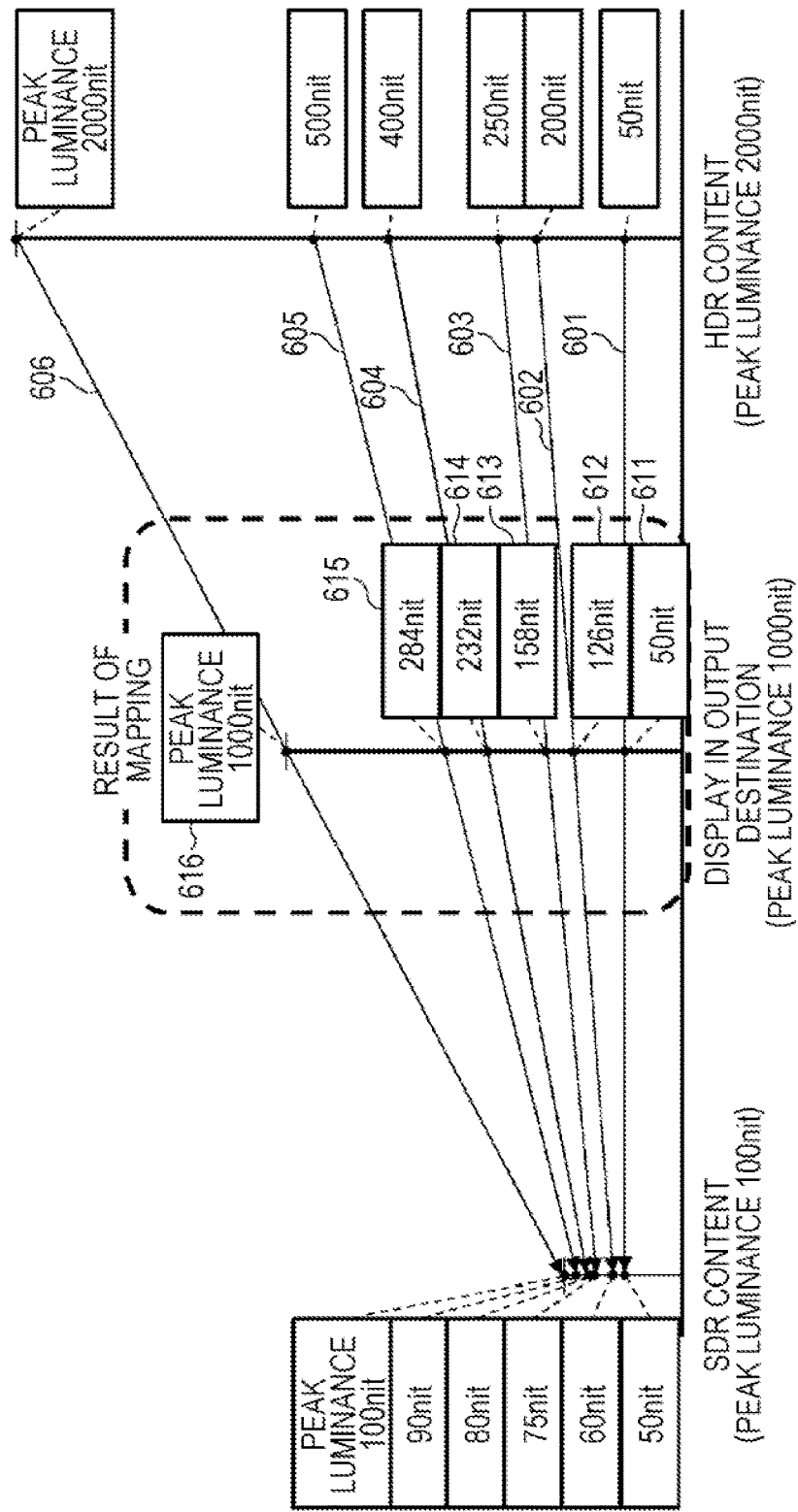
FIG. 6 is a view illustrating a mechanism to perform mapping on luminance of a display to be an output destination from luminance conversion information from HDR content into SDR content.

In FIG. 6, a mechanism to perform mapping on luminance of a display (with peak luminance 1000 nit) to be an output destination based on luminance conversion information from HDR content with peak luminance 2000 nits into SDR content with peak luminance 100 nits (see FIG. 5) which information is used as meta information is illustrated.

In the 1D-LUT of the luminance conversion information transferred as metadata, as indicated by reference numbers 601 to 606, a correspondence relationship of luminance 50 nits, 200 nits, 250 nits, 400 nits, and 500 nits of original HDR content and peak luminance 2000 nits of the content with luminance 50 nits, 60 nits, 75 nits, 80 nits, and 90 nits of SDR content after luminance conversion and peak luminance 100 nits of the content is described.

On the side of the image utilization apparatus 300, from luminance conversion information from HDR content into SDR content such as what has been described above, mapping is performed on luminance conversion information for display mapping of HDR content with peak luminance 2000 nits on a display (with peak luminance 1000 nit) to be an output destination. For example, according to the following equation (1), luminance for mapping on a display in an output destination can be calculated from metadata.

[Math. 1]

$$L_{Display}(i) = \left(\left(\frac{L_{HDR}(i) - L_{SDR}(i)}{PeakL_{HDR} - PeakL_{SDR}}\right) \times (PeakL_{Display} - PeakL_{SDR})\right) + L_{SDR}(i) \quad (1)$$

With the above equation (1), luminance information at an ith point described in the 1D-LUT of the metadata is display-mapped on a luminance value of a display (with peak luminance 1000 nit) in an output destination. Here, in the equation, Peak $L_{HDR}$ is peak luminance of HDR content, Peak $L_{SDR}$ is peak luminance of SDR content, Peak $L_{Display}$ is peak luminance of a display in an output destination. $L_{HDR}(i)$ is luminance of HDR content corresponding to an ith point of the 1D-LUT, $L_{SDR}(i)$ is luminance of SDR content corresponding to the ith point of the 1-LUT, and $L_{Display}(i)$ is luminance which is mapped for a display in an output destination from the ith point of the 1D-LUT.

According to the above luminance calculation equation (1), as illustrated in FIG. 6, luminance 50 nits, 200 nits, 250 nits, 400 nits, and 500 nits of original HDR content and peak luminance 2000 nits of the content are respectively mapped with 50 nits, 126 nits, 158 nits, 232 nits, 284 nits, and 1000 nits of a display in an output destination as indicated by reference numbers 611 to 616.

Figure 7:
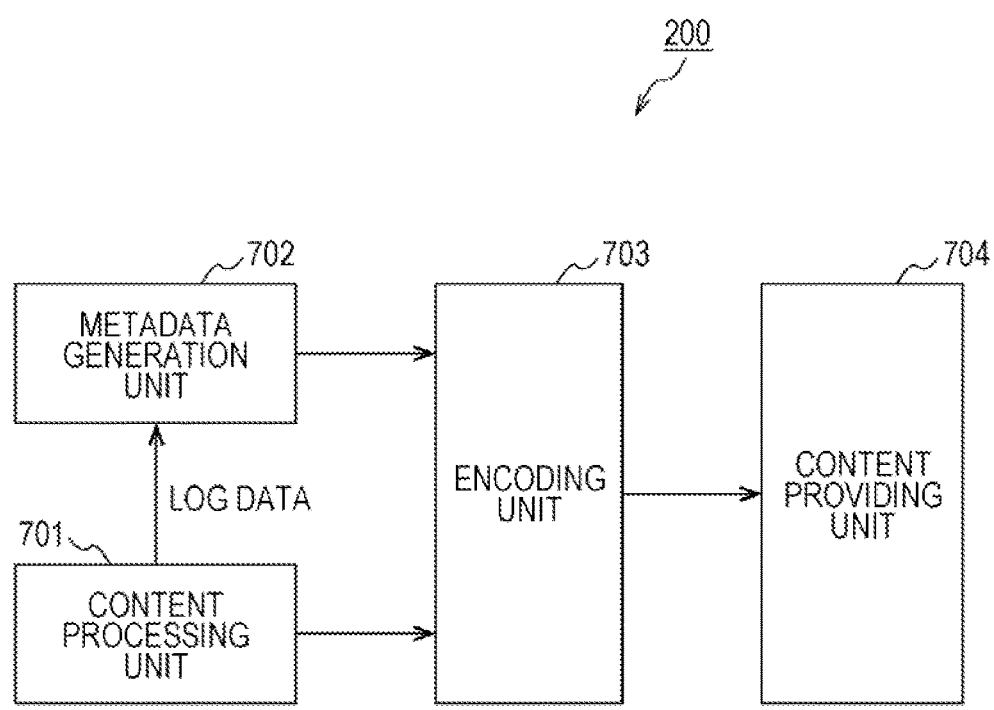
FIG. 7 is a view illustrating a functional configuration in which the image providing apparatus 200 transfers metadata.

In FIG. 7, a functional configuration in which the image providing apparatus 200 transfers metadata of luminance conversion information (1D-LUT) from HDR content into SDR content is illustrated.

By the mechanism illustrated in FIG. 2, a content processing unit 701 processes HDR content to be provided to the image utilization apparatus 300.

A metadata generation unit 702 acquires luminance conversion information (1D-LUT) from HDR content into SDR content by using log data in an authoring flow in the content processing unit 701 or based on differential information between produced HDR content and produced SDR content and generates metadata.

By inputting processed content from the content processing unit 701 and inputting metadata generated by the metadata generation unit 702, an encoding unit 703 performs encoding into stream data in a predetermined encoding format such as the MPEG2. Here, the encoding unit 703 stores the metadata (1D-LUT) into SEI already-defined in the MPEG or SEI newly-defined for transmission of luminance conversion information. Alternatively, in a case where a form of providing HDR content is a Blue-ray disc, the metadata (1D-LUT) may be stored into a database file in the Blue-ray disc.

A content providing unit 704 provides encoded content to the image utilization apparatus 300. When the image providing system 100 is applied to a recording/reproduction system such as an UHD-BD, the content providing unit 704 records encoded content into a Blue-ray disc. Alternatively, the image providing system 100 is applied to an Internet distribution service such as an OTT, the content providing unit 704 uploads encoded content to a streaming server. Also, when the image providing system 100 is applied to a digital broadcasting service, the content providing unit 704 transmits encoded content as a broadcast signal.

Here, a case where "knee_function_info SEI" which is defined, in the MPEG, as dynamic range conversion determination information of non-compressed image data is used as a transmission container of the luminance conversion information (1D-LUT) will be described. Note that in a case of using the knee_function_info SEI as a transmission container, a luminance value is expressed as a linear luminance value.

In FIG. 8, a syntax example 800 of the dynamic range conversion determination information "knee_function_info SEI" is illustrated. Original meaning of each parameter is described.

In the knee_function_info 800, a knee conversion ID (knee_function_id) 801 and a knee conversion cancel flag (knee_function_cancel_flag) 802 are set.

The knee conversion ID 801 is an ID unique for a purpose of knee conversion which is knee compression or knee extension. In the present embodiment, it is assumed that the knee conversion ID 801 is set at a low level "0" in a case of using the knee_function_info SEI as original dynamic range conversion determination information and that the knee conversion ID 801 is set at a high level "1" in a case of using the knee_function_info SEI as a transmission container of the luminance conversion information from HDR content into SDR content. Also, the knee conversion cancel flag 802 is a flag indicating whether to cancel continuity of previous knee_function_info. In a case of canceling the continuity of the previous knee_function_info, the knee conversion cancel flag 802 is set at a high level "1". In a case of not canceling the continuity, the knee conversion cancel flag 802 is set at a low level "0".

Also, in a case where the knee conversion cancel flag 802 is at the low level "0", dynamic range conversion determination information is set as the knee_function_info 800. In the dynamic range conversion determination information, a persistence flag (knee_function_persistence_flag) 803, input image dynamic range information (input_d_range) 804 to store peak luminance (in 0.1% unit) of an input image, input image display peak luminance information (input_disp_luminance) 805 to store brightness of a display (in 0.1% unit) corresponding to peak luminance of an input image, output image dynamic range information (output_d_range) 806 to store peak luminance (in 0.1% unit) of an output image, output display peak luminance information (output_disp_luminance) 807 to store brightness of a display (in 0.1% unit) corresponding to peak luminance of the output image, and information of the number of knee points (num_knee_point_minus1) 808 are set. Also, a loop 810 of information of each knee point is arranged only for a several minutes of the information of the number of knee points 808. In a loop of information of each knee point, knee point information before conversion (input_knee_point) 811 of each knee point and knee point information after conversion (output_knee_point) 812 of each knee point are set.

The persistence flag 803 indicates whether knee_function_info 800 transmitted once is valid after the transmission or can be used only once. When the knee_function_info 800 is valid only for an added picture, the persistence flag 803 is set at a low level "0" and when the knee_function_info 800 is valid until a stream is switched or until a new knee conversion ID 801 is received, the persistence flag 803 is set at a high level "1".

Originally, the information of the number of knee points 808 is a value in which one is subtracted from the number of knee points. Note that an order i (i is integer equal to or larger than 0) in which the knee point information before conversion 811 and the knee point information after conversion 812 of the knee point are set is in an ascending order of the knee point information before conversion 811. In each loop for a next several minutes of the number of knee points, the knee point information before conversion 811 and the knee point information after conversion 812 at a knee point i are stored.

The knee point information before conversion 811 is information indicating a knee point of an image, which is to be encoded, before conversion in dynamic range conversion. The knee point information before conversion 811 is expressed by permillage (linear value) of a knee point of when the maximum value of luminance of the image to be encoded is set as 1000‰. The knee point is luminance in a region, other than a start point 0, of luminance knee-converted by a conversion rate identical to that of a dynamic range of luminance of the image to be processed.

Also, the knee point information after conversion 812 is information indicating a start point in a range of luminance corresponding to a range of luminance knee-converted with a knee point of an image, which is converted in dynamic range conversion, as a start point. More specifically, the knee point information after conversion (output_knee_point) is expressed by permillage (linear value) of luminance of a converted image corresponding to a knee point of when the maximum value of the luminance of the converted image is set as 1000‰.

In a case of using the knee_function_info SEI illustrated in FIG. 8 as a transmission container of luminance conversion information from HDR content into SDR content which information is useful for display mapping, in the knee point information loop 810, luminance $L_{HDR}(i)$ of HDR content before conversion which luminance corresponds to an ith point of the 1D-LUT as ith knee point information before conversion (input_knee_point) is stored and luminance $L_{SDR}(i)$ of SDR content after conversion which luminance corresponds to the ith point of the 1D-LUT as ith knee point information after conversion (output_knee_point) is stored. However, the last knee point information before conversion (input_knee_point) stores peak luminance of the HDR content before conversion and the last knee point information after conversion (output_knee_point) stores peak luminance of the SDR content after conversion.

An example in which the 1D-LUT of the luminance conversion information illustrated in FIG. 5 is set in each parameter of the knee_function_info SEI is expressed in the following table 1. Also, in FIG. 9, an example of the parameter setting illustrated in the table 1 is illustrated as dynamic range conversion information. In one embodiment such as exemplified in FIG. 9, for a plurality of input_knee_points representative of a luminance conversion function which is based on an intension of a producer of content, a first line extending from a first point to a second point of the plurality of input_knee_points has a first inclination and a second line extending from the second point to a third point of the plurality input_knee_points has a second inclination, and the second inclination has a second gradient different from a first gradient of the first inclination in accordance with an intension of the producer of content, such that the second gradient may be greater or less than the first gradient.

TABLE 1

| Field Name | Parameter Value |
| --- | --- |
| input_d_range | 0 |
| output_d_range | 0 |
| input_disp_luminance | 10000 |
| output_disp_luminance | 100 |
| num_knee_points_minus1 | 5 |
| input_knee_point[0] | 5 |
| output_knee_point [0] | 500 |
| input_knee_point[1] | 20 |
| output_knee_point[1] | 600 |
| input_knee_point[2] | 25 |
| output_knee_point [2] | 750 |
| input_knee_point[3] | 40 |
| output_knee_point[3] | 800 |
| input_knee_point[4] | 50 |
| output_knee_point[4] | 900 |
| input_knee_point[5] | 200 |
| output_knee_point[5] | 1000 |

Then, a case where "Tone_mapping_Info SEI" defined in H.265 (ISO/IEC 23008-2 high efficiency video coding (HEVC)) is used as a transmission container of the luminance conversion information (1D-LUT) will be described. Note that in a case of setting the Tone_mapping_Info SEI as a transmission container, a luminance value is expressed as a code value.

In FIG. 10, a syntax example 1000 of tone mapping information "Tone_mapping_Info SEI" is illustrated. A detail description of a meaning of each parameter is omitted. Here, tone mapping information of tone_map_model_id=3 indicated by a reference number 1003 is used for a transmission container of the luminance conversion information (1D-LUT).

In coded_data_bit_depth indicated by a reference number 1001, a bit depth of the HDR content before conversion is stored. In target_bit_depth indicated by a reference 1002, a bit depth of the SDR content after conversion is stored. Also, in num_pivots indicated by a reference number 1004, the number of points of the luminance conversion information (1D-LUT) is stored. Then, in the ith loop of the following loops, coded_pivot_value[i] indicated by a reference number 1005, a code value of luminance $L_{HDR}(i)$ of the HDR content before conversion which content corresponds to the ith point of the 1D-LUT is stored. In target_pivo_value[i] indicated by a reference number 1006, a code value of luminance $L_{SDR}(i)$ of the SDR content after conversion which content corresponds to the ith point of the 1D-LUT is stored. Here, in the last coded_pivot_value[i], a code value of peak luminance of the HDR content before conversion is stored. In the last target_pivot_value[i], a code value of peak luminance of the SDR content after conversion is stored.

In FIG. 11, a functional configuration in which the image utilization apparatus 300 processes HDR content based on metadata of the luminance conversion information (1D-LUT) from HDR content into SDR content is illustrated.

A content acquisition unit 1101 acquires HDR content provided by the image providing apparatus 200. In a case where the image providing system 100 is applied to a recording/reproduction system such as an UHD-BD, the content acquisition unit 1101 reproduces content recorded in the Blue-ray disc. Alternatively, when the image providing system 100 is applied to an Internet distribution service such as an OTT, the content acquisition unit 1101 receives content from a streaming server through a network such as the Internet. Also, when the image providing system 100 is applied to a digital broadcasting service, the content acquisition unit 1101 is a tuner or the like. The content acquisition unit 1101 selects a channel and receives a broadcast signal.

A decoding unit 1102 decodes stream data in a predetermined encoding format such as the MPEG2 and separates the data into stream data and metadata.

A metadata processing unit 1103 processes the luminance conversion information (1D-LUT) from HDR content into SDR content which information is included in the metadata. A stream data processing unit 1104 processes the stream data and performs display output onto a display 1105 in an output destination. Also, a stream data processing unit 1104 also performs display mapping based on the luminance conversion information (1D-LUT).

Figure 12:
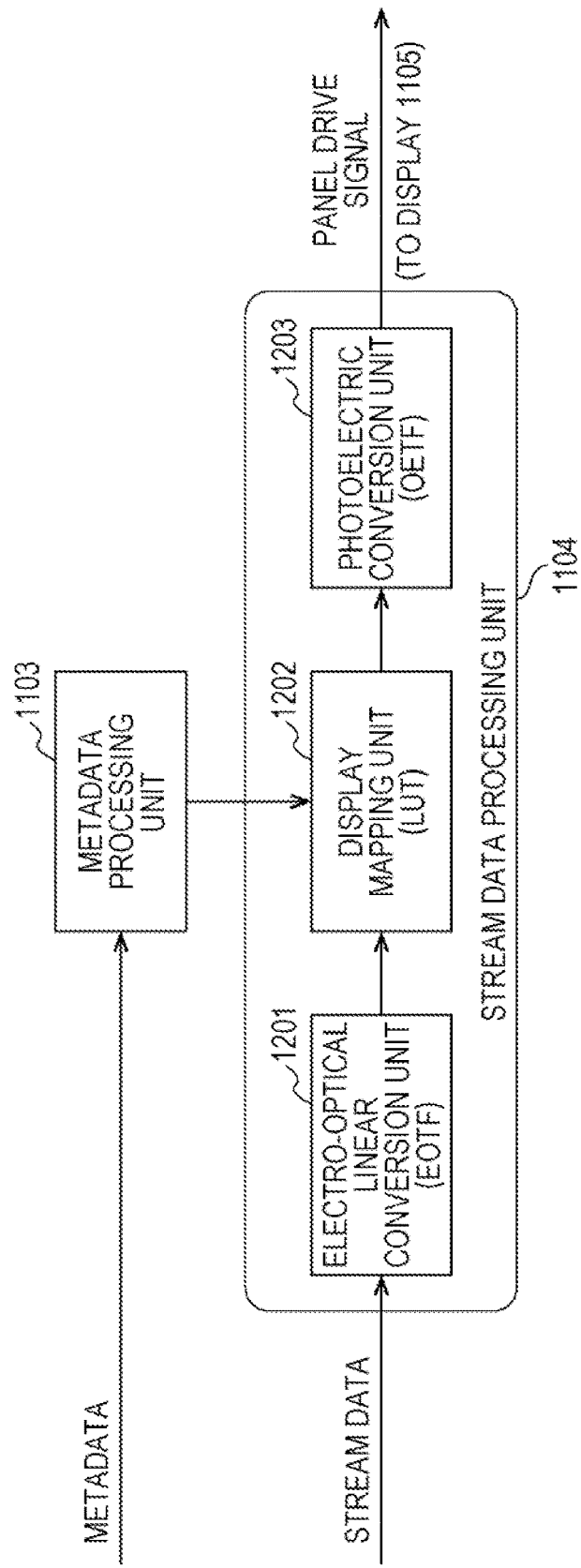
FIG. 12 is a view illustrating an example of a functional configuration to perform display mapping based on luminance conversion information (1D-LUT).

In FIG. 12, an example of a functional configuration to perform display mapping based on the luminance conversion information (1D-LUT) in the image utilization apparatus 300 is illustrated. However, in the illustrated example, it is assumed that the luminance conversion information (1D-LUT) is transferred as a linear luminance value by a transmission container such as the knee_function_info SEI. After electro-optical linear conversion of stream data is performed, display mapping is performed.

An electro-optical linear conversion unit 1201 includes an EOTF table to convert stream data in an HDR into an optical linear luminance signal and converts input stream data in an HDR into an optical linear luminance signal.

A display mapping unit 1202 includes a look-up table (LUT) to convert a dynamic range of the optical linear luminance signal. When luminance conversion information (1D-LUT) from HDR content into SDR content (see FIG. 5, FIG. 8, and FIG. 9) is input as metadata, a metadata processing unit 1103 converts HDR content into luminance conversion information (1D-LUT) for display mapping of on the display 1105 in an output destination according to the mechanism illustrated in FIG. 6 and the above equation (1) and sets the information in the display mapping unit 1202. Then, the display mapping unit 1202 converts a dynamic range of the optical linear luminance signal according to the set LUT.

A photoelectric conversion unit 1203 includes an OETF table to convert an optical linear luminance signal into a panel drive signal and converts a display-mapped luminance signal into a panel drive signal adapted to an input characteristic of the display 1105.

Figure 13:
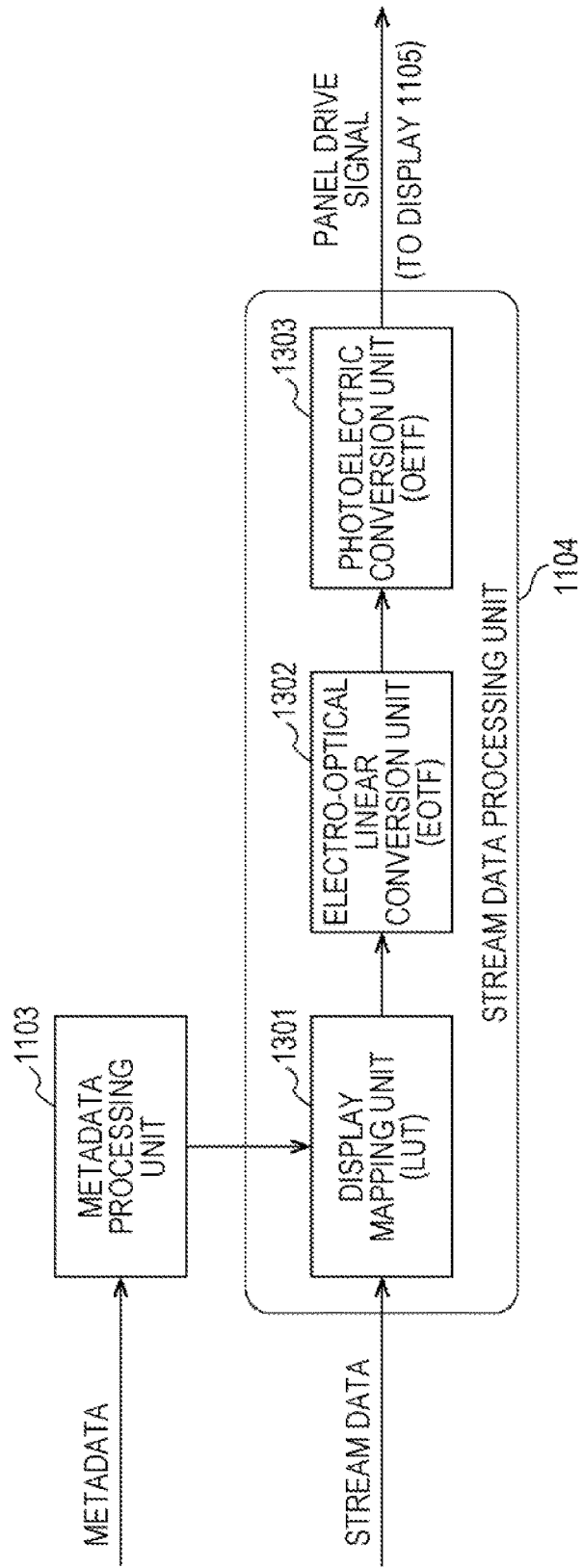
FIG. 13 is a view illustrating a different example of a functional configuration to perform display mapping based on luminance conversion information (1D-LUT).

Also, in FIG. 13, a different example of a functional configuration to perform display mapping based on the luminance conversion information (1D-LUT) in the image utilization apparatus 300 is illustrated. However, in the illustrated example, it is assumed that the luminance conversion information (1D-LUT) is transferred as a code value by a transmission container such as Tone mapping_info SEI and display mapping is performed before electro-optical linear conversion of stream data.

A display mapping unit 1301 includes a look-up table (LUT) to convert a dynamic range of a luminance code value. When the luminance conversion information (1D-LUT) from HDR content into SDR content (see FIG. 10) is input as metadata, the metadata processing unit 1103 converts performs conversion into the luminance conversion information (1D-LUT) for display mapping of HDR content on the display 1105 in an output destination and sets the information in the display mapping unit 1301. Then, the display mapping unit 1301 converts a dynamic range of stream data before electro-optical linear conversion according to the set LUT.

An electro-optical linear conversion unit 1302 includes an EOTF table to convert stream data in a HDR into an optical linear luminance signal and converts input stream data in the HDR into an optical linear luminance signal.

A photoelectric conversion unit 1303 includes an OETF table to convert an optical linear luminance signal into a panel drive signal and converts display-mapped luminance signal into a panel drive signal adapted to an input characteristic of the display 1105.

Figure 14:
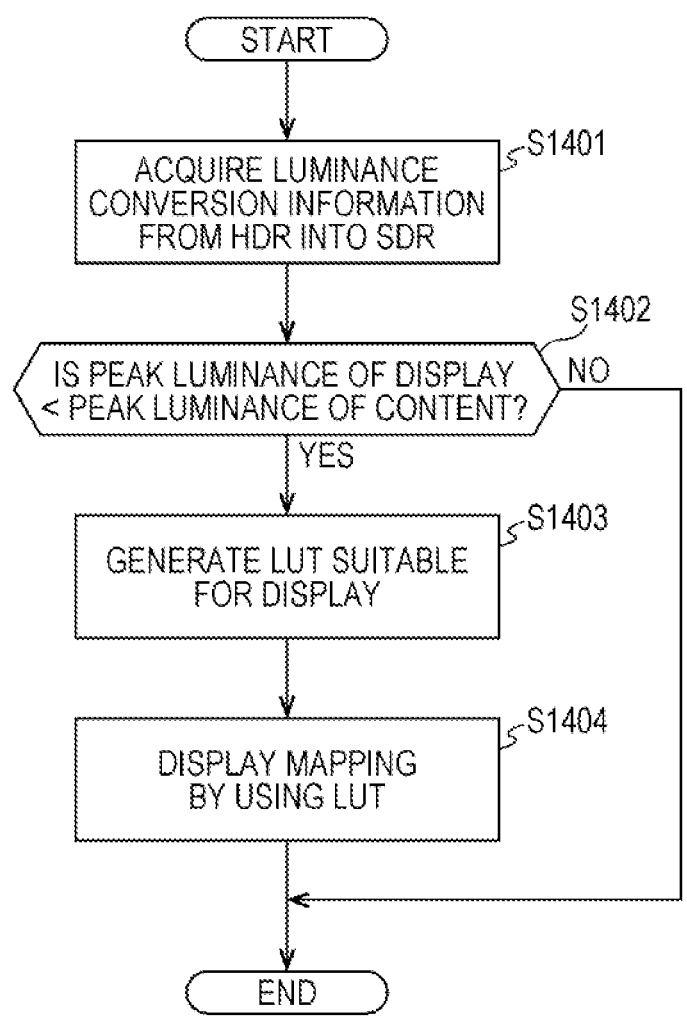
FIG. 14 is a flowchart illustrating a processing procedure of performing display mapping of HDR content on a display 1105 in an output destination.

In FIG. 14, a processing procedure, in the image utilization apparatus 300, to perform display mapping of HDR content on the display 1105 in an output destination is illustrated in a format of a flowchart.

First, the metadata processing unit 1103 acquires, as metadata of content, luminance conversion information from HDR content into SDR content (step S1401).

Then, the metadata processing unit 1103 checks whether peak luminance of the display 1105 in an output destination is lower than peak luminance of the HDR content (step S1402).

Here, when the peak luminance of the display 1105 in the output destination is equal to or higher than the peak luminance of the HDR content (No in step S1402), the HDR content provided by the image providing apparatus 200 can be output to the display 1105 as it is. That is, since display mapping is not necessary, the whole following processing is skipped and the present processing routine is ended. Note that as a modification, display mapping to expand a dynamic range of the provided HDR content may be performed according to the peak luminance of the display 1105.

On the other hand, when the peak luminance of the display 1105 in the output destination is lower than the peak luminance of the HDR content (Yes in step S1402), display mapping of the HDR content is necessary for adaptation to the peak luminance of the display 1105 in the output destination.

Thus, when the luminance conversion information (1D-LUT) from HDR content into SDR content (see FIG. 5, FIG. 8, and FIG. 9) is input as metadata, the metadata processing unit 1103 generates the luminance conversion information (1D-LUT) for display mapping of the HDR content on the display 1105 in the output destination according to the mechanism illustrated in FIG. 6 and the above equation (1) (step S1403).

Then, according to the set LUT, display mapping of the content is executed (step S1404).

In an exemplary embodiment, one or more of the units of each of the image providing apparatus 200 and the image utilization apparatus 300 may be embodied as a microprocessing device, various processing circuits or circuitry and the like that performs functions, in accordance with the present disclosure. In some embodiments, the microprocessing device may include a processor device and a recording medium, such as ROM or RAM, that stores programs executed by the processing device to perform the functions and also stores data, in accordance with the present disclosure. Examples of the recording medium may include a magnetic recording medium such as a hard disk, nonvolatile memory such as a flash memory, or a removable memory.

CITATION LIST

Patent Literature

PTL 1: JP 2014-502480 W

INDUSTRIAL APPLICABILITY

In the above, the technology disclosed in the present description has been described in detail with reference to a specific embodiment. However, it is obvious that correction or alternation of the embodiment can be made by those skilled in the art within the spirit and the scope of the technology disclosed in the present description.

In the present description, an embodiment applied to an image providing system which provides HDR content and which is, for example, an UHD-BD, an Internet distribution service such as an OTT, or a digital broadcasting service has been mainly described but the spirit of the technology disclosed in the present description is not limited thereto. The technology disclosed in the present description can be applied to various systems to transmit or display HDR content.

That is, the technology disclosed in the present description is described as an example and described contents of the present description should not be interpreted in a limited manner. The spirit of the technology disclosed in the present description should be determined based on the claims.

Note that the technology disclosed in the present description may also include the following configurations.

(1) An image processing apparatus including: an information acquisition unit configured to acquire luminance conversion information for conversion of content in a first dynamic range into content in a second dynamic range; and a metadata generation unit configured to generate metadata of content based on the luminance conversion information.

(1-1) The image processing apparatus according to (1), wherein the information acquisition unit acquires the luminance conversion information based on log data in a process of editing the content in the second dynamic range from the content in the first dynamic range.

(1-2) The image processing apparatus according to (1), wherein the information acquisition unit acquires luminance conversion information based on a relationship between produced content in the first dynamic range and produced content in the second dynamic range.

(2) The image processing apparatus according to (1), wherein the metadata generation unit generates the metadata including a relationship between luminance values before and after conversion from the first dynamic range into the second dynamic range at one or more points.

(3) The image processing apparatus according to (1) or (2), further including a transmission unit configured to transmit the metadata while storing the metadata in a predetermined transmission container.

(4) The image processing apparatus according to (3), wherein the transmission unit transmits the metadata expressing luminance conversion information in a linear luminance value.

(5) The image processing apparatus according to (3) or (4), wherein the transmission unit stores the metadata into knee_function_info SEI of the content.

(6) The image processing apparatus according to (3), wherein the transmission unit transmits the metadata expressing luminance conversion information in a code value.

(7) The image processing apparatus according to (3) or (6), wherein the transmission unit stores the metadata into Tone_mapping_info SEI of the content.

(8) An image processing apparatus including: a metadata processing unit configured to generate, based on metadata including luminance conversion information for conversion of content in a first dynamic range into content in a second dynamic range, second luminance conversion information for adaptation of the content in the first dynamic range to a display in an output destination; and a content processing unit configured to process the content in the first dynamic range based on the second luminance conversion information.

(9) The image processing apparatus according to (8), wherein the metadata processing unit generates a conversion table to convert a luminance value in the first dynamic range into a luminance value in the display with a predetermined peak luminance based on the metadata including a relationship between luminance values before and after conversion from the first dynamic range into the second dynamic range at one or more points, and the content processing unit converts luminance of the content in the first dynamic range based on the conversion table.

(10) The image processing apparatus according to (8) or (9), wherein the metadata processing unit generates the second luminance conversion information based on metadata stored in a predetermined transmission container.

(11) The image processing apparatus according to (10), wherein the metadata processing unit generates the second luminance conversion information based on the metadata expressing luminance conversion information in a linear luminance value, and the content processing unit performs processing with respect to a luminance signal, on which electro-optical linear conversion processing is performed, based on the second luminance conversion information.

(12) The image processing apparatus according to (10) or (11), wherein the metadata processing unit generates the second luminance conversion information based on metadata stored in knee_function_info SEI of the content.
(13) The image processing apparatus according to (10), wherein the metadata processing unit generates the second luminance conversion information based on the metadata expressing luminance conversion information in a code value, and the content processing unit performs processing with respect to a luminance code value, on which electro-optical linear conversion processing is performed, based on the second luminance conversion information.
(14) The image processing apparatus according to (10) or (13), wherein the metadata processing unit generates the second luminance conversion information based on metadata stored in Tone_mapping_info SEI of the content.
(15) The image processing apparatus according to (8), wherein when peak luminance of the display is higher than peak luminance of the first dynamic range, the metadata processing unit does not generate the second luminance conversion information and does not make the content processing unit perform processing of the content in the first dynamic range.
(16) An image processing method including: information acquiring to acquire luminance conversion information for conversion of content in a first dynamic range into content in a second dynamic range; and metadata generating to generate metadata of content based on the luminance conversion information.
(17) An image processing method including: metadata processing to generate, based on metadata including luminance conversion information for conversion of content in a first dynamic range into content in a second dynamic range, second luminance conversion information for adaptation of the content in the first dynamic range to a display in an output destination; and content processing to process the content in the first dynamic range based on the second luminance conversion information.

The present technology may also be configured as below.

(1) An image processing apparatus including:
circuitry configured to: generate, based on metadata including luminance conversion information and a capability of a display in an output destination, second luminance conversion information for adaptation of content in a first dynamic range to the display; and process the content in the first dynamic range based on the second luminance conversion information.
(2) The image processing apparatus according to (1), wherein the capability includes a peak luminance of the display and the metadata is generated based on comparison of peak luminance of the display in the output destination with peak luminance of the content in the first dynamic range.
(3) The image processing apparatus according to (1) or (2), wherein the circuitry is configured to: generate a conversion table to convert a luminance value in the first dynamic range into a luminance value in the display with a predetermined peak luminance based on the metadata including a relationship between luminance values before and after conversion from the first dynamic range into a second dynamic range at one or more points, and convert luminance of the content in the first dynamic range based on the conversion table.
(4) The image processing apparatus according to any one of (1) to (3), wherein the circuitry is configured to generate the second luminance conversion information based on metadata stored in a predetermined transmission container.
(5) The image processing apparatus according to any one of (1) to (4), wherein the circuitry is configured to: generate the second luminance conversion information based on the metadata expressing luminance conversion information in a linear luminance value, and perform processing with respect to a luminance signal, on which electro-optical linear conversion processing is performed, based on the second luminance conversion information.
(6) The image processing apparatus according to any one of (1) to (5), wherein circuitry is configured to generate the second luminance conversion information based on metadata stored in knee_function_info supplemental enhancement information (SEE) of the content.
(7) The image processing apparatus according to any one of (1) to (6), wherein the circuitry is configured to: generate the second luminance conversion information based on the metadata expressing luminance conversion information in a code value, and perform processing with respect to a luminance code value, on which electro-optical linear conversion processing is performed, based on the second luminance conversion information.
(8) The image processing apparatus according to (1) to (7), wherein the circuitry is configured to generate the second luminance conversion information based on metadata stored in Tone_mapping_info supplemental enhancement information (SEI) of the content.
(9) The image processing apparatus according to any one of (1) to (8), wherein when peak luminance of the display is higher than peak luminance of the first dynamic range, the circuitry does not generate the second luminance conversion information and does not perform processing of the content in the first dynamic range.
(10) An image processing method comprising:
generating, by a processing device, based on metadata including luminance conversion information and a capability of a display in an output destination, second luminance conversion information for adaptation of content in a first dynamic range to the display; and processing, by the processing device, the content in the first dynamic range based on the second luminance conversion information.
(11) An image processing apparatus including:
circuitry configured to: acquire luminance conversion information for conversion of content in a first dynamic range into content in a second dynamic range; and generate metadata of content based on the luminance conversion information, in which the luminance conversion information is based on an intension of a content producer for use in display mapping.
(12) The image processing apparatus according to (11), wherein the circuitry is configured to generate the metadata including a relationship between luminance values before and after conversion from the first dynamic range into the second dynamic range at one or more points.

(13) The image processing apparatus according to (11) or (12), wherein the circuitry is configured to transmit the metadata while storing the metadata in a predetermined transmission container.
(14) The image processing apparatus according to any one of (11) to (13),
wherein the circuitry is configured to transmit the metadata expressing luminance conversion information in a linear luminance value.
(15) The image processing apparatus according to any one of (11) to (14),
wherein the circuitry is configured to store the metadata into knee_function_info supplemental enhancement information (SEI) of the content.
(16) The image processing apparatus according to any one of (11) to (15), wherein the circuitry is configured to transmit the metadata expressing luminance conversion information in a code value.
(17) The image processing apparatus according to any one of (11) to (16),
wherein the circuitry is configured to store the metadata into Tone_mapping_info supplemental enhancement information (SEI) of the content.
(18) The image processing apparatus according to any one of (11) to (17),
wherein the circuitry is configured to transmit the metadata expressing flag information indicating whether the metadata indicates a knee function curve or the luminance conversion information based on the intension of the content producer.
(19) The image processing apparatus according to any one of (11) to (18),
wherein the circuitry is configured to transmit the metadata expressing flag information indicating whether the metadata indicates tone mapping information or the luminance conversion information based on the intension of the content producer.
(20) The image processing apparatus according to any one of (11) to (19),
wherein the luminance conversion information describes a plurality of points representative of a luminance conversion function which is based on the intension of the content producer, in which a first line extending from a first point to a second point of the plurality of points has a first inclination and a second line extending from the second point to a third point of the plurality of points has a second inclination, and in which the second inclination has a second gradient different from a first gradient of the first inclination in accordance with the intension of the content producer.
(21) The image processing apparatus according to any one of (11) to (20),
wherein the second gradient is greater or less than the first gradient.
(22) An image processing method including:
information acquiring, by a processing device, to acquire luminance conversion information for conversion of content in a first dynamic range into content in a second dynamic range; and metadata generating, by the processing device, to generate metadata of content based on the luminance conversion information, in which the luminance conversion information is based on an intension of a content producer for use in display mapping.

REFERENCE SIGNS LIST 100 image providing system
200 image providing apparatus
201 photographing unit
202 grading/mastering unit 202
203 photoelectric conversion unit
300 image utilization apparatus
301 decoding unit
302 electro-optical linear conversion unit
303 linear display gamma conversion unit
304 display unit
701 content processing unit
702 metadata generation unit
703 encoding unit
704 content providing unit
1101 content acquisition unit
1102 decoding unit
1103 metadata processing unit
1104 stream data processing unit
1105 display
1201 linear electro-optical conversion unit
1202 display mapping unit
1203 photoelectric conversion unit
1301 display mapping unit
1302 linear electro-optical conversion unit
1303 photoelectric conversion unit

The invention claimed is:
1. An image processing apparatus comprising:
circuitry configured to:
generate, based on metadata including luminance conversion information and a capability of a display in an output destination, second luminance conversion information for adaptation of content in a first dynamic range to the display;
process the content in the first dynamic range based on the second luminance conversion information,
in which the metadata includes a relationship between values of luminance levels before and after conversion from the first dynamic range into a second dynamic range at selected points,
in which the metadata describes the relationship in a one-dimensional table including, for each of the selected points, values of measurement of luminance levels,
in which, in the one-dimensional table for each of the selected points, the value of luminance level before conversion is expressed as a linear luminance value of the content in the first dynamic range and the value of luminance level after conversion is expressed as a linear luminance value of the content in the second dynamic range,
in which, for a first point of the selected points, the value of luminance level before conversion is a peak linear luminance value of the content in the first dynamic range and the value of luminance level after conversion is a peak linear luminance value of the content in the second dynamic range, and
in which the display has a third dynamic range different from the first and second dynamic ranges, and a peak linear luminance value of the third dynamic range is other than the peak linear luminance value of the content in the first dynamic range and the peak linear luminance value of the content in the second dynamic range; and
perform a mapping of luminance values for the display at each of the selected points, based on a mathematical relationship among the peak linear luminance value of the content in the first dynamic range, the peak linear luminance value of the content in the second dynamic range and the peak linear luminance value of the third dynamic range.

2. The image processing apparatus according to claim 1, wherein the circuitry is configured to:
generate a conversion table to convert a first linear luminance value in the first dynamic range into a first linear luminance value in the display based on the metadata, and
convert luminance of the content in the first dynamic range based on the conversion table.

3. The image processing apparatus according to claim 1, wherein the metadata is stored in a predetermined transmission container.

4. The image processing apparatus according to claim 3, wherein the circuitry is configured to:
perform processing with respect to a luminance signal, on which electro-optical linear conversion processing is performed, based on the second luminance conversion information.

5. The image processing apparatus according to claim 3, wherein the metadata is stored in knee_function_info supplemental enhancement information (SEI) of the content.

6. The image processing apparatus according to claim 3, wherein the circuitry is configured to:
generate the second luminance conversion information based on the metadata expressing luminance conversion information in a code value, and
perform processing with respect to a luminance code value, on which electro-optical linear conversion processing is performed, based on the second luminance conversion information.

7. The image processing apparatus according to claim 3, wherein the circuitry is configured to generate the second luminance conversion information based on metadata stored in Tone_mapping_info supplemental enhancement information (SEI) of the content.

8. The image processing apparatus according to claim 1, wherein when peak luminance of the display is higher than the peak linear luminance value of the content in the first dynamic range, the circuitry does not generate the second luminance conversion information and does not perform processing of the content in the first dynamic range.

9. An image processing method comprising:
generating, by a processing device, based on metadata including luminance conversion information and a capability of a display in an output destination, second luminance conversion information for adaptation of content in a first dynamic range to the display;
processing, by the processing device, the content in the first dynamic range based on the second luminance conversion information,
in which the metadata includes a relationship between values of luminance levels before and after conversion from the first dynamic range into a second dynamic range at selected points,
in which the metadata describes the relationship in a one-dimensional table including, for each of the selected points, values of measurement of luminance levels,
in which, in the one-dimensional table for each of the selected points, the value of luminance level before conversion is expressed as a linear luminance value of the content in the first dynamic range and the value of luminance level after conversion is expressed as a linear luminance value of the content in the second dynamic range,
in which, for a first point of the selected points, the value of luminance level before conversion is a peak linear luminance value of the content in the first dynamic range and the value of luminance level after conversion is a peak linear luminance value of the content in the second dynamic range, and
in which the display has a third dynamic range different from the first and second dynamic ranges, and a peak linear luminance value of the third dynamic range is other than the peak linear luminance value of the content in the first dynamic range and the peak linear luminance value of the content in the second dynamic range; and
performing, by the processing device, a mapping of luminance values for the display at each of the selected points, based on a mathematical relationship among the peak linear luminance value of the content in the first dynamic range, the peak linear luminance value of the content in the second dynamic range and the peak linear luminance value of the third dynamic range.

10. An image processing apparatus comprising:
circuitry configured to:
acquire luminance conversion information for conversion of content in a first dynamic range into content in a second dynamic range; and
generate metadata of content based on the luminance conversion information, in which the luminance conversion information is based on an intension of a content producer for use in display mapping to a display,
in which the intension of the content producer is with respect to luminance conversion of given content in the first dynamic range into converted given content in the second dynamic range and indicates an extent luminance information is to be kept based on luminance conversion processing in a region of a predetermined level of luminance in the first dynamic range,
in which the metadata describes the intension of the content producer in a one-dimensional table expressing a relationship of values of measurement of luminance levels before and after conversion from the first dynamic range into the second dynamic range at selected points,
in which, in the one-dimensional table, for each of the selected points, a value of luminance level of the given content is expressed as a linear luminance value of the given content in the first dynamic range and a value of luminance level of the converted given content is expressed as a linear luminance value of the converted given content in the second dynamic range,
in which a first point in the one-dimensional table describes a correspondence relationship of a peak linear luminance value of the given content in the first dynamic range with a peak linear luminance value of the converted given content in the second dynamic range,
in which the display has a third dynamic range different from the first and second dynamic ranges, and a peak linear luminance value of the third dynamic range is other than the peak linear luminance value of the given content in the first dynamic range and the peak linear luminance value of the converted content in the second dynamic range, and in which the display mapping to the display includes mapping of luminance values for the display at each of the selected points, based on a mathematical relationship among the peak linear luminance value of the content in the first dynamic range, the peak linear luminance value of the content in the second dynamic range and the peak linear luminance value of the third dynamic range.

11. The image processing apparatus according to claim 10,
wherein the circuitry is configured to transmit the metadata while storing the metadata in a predetermined transmission container.

12. The image processing apparatus according to claim 11,
wherein the circuitry is configured to store the metadata into knee_function_info supplemental enhancement information (SEI) of the content.

13. The image processing apparatus according to claim 11,
wherein the circuitry is configured to transmit the metadata expressing luminance conversion information in a code value.

14. The image processing apparatus according to claim 11,
wherein the circuitry is configured to store the metadata into Tone_mapping_info supplemental enhancement information (SEI) of the content.

15. The image processing apparatus according to claim 10,
wherein the circuitry is configured to transmit the metadata expressing flag information indicating whether the metadata indicates a knee function curve or the luminance conversion information based on the intension of the content producer.

16. The image processing apparatus according to claim 10,
wherein the circuitry is configured to transmit the metadata expressing flag information indicating whether the metadata indicates tone mapping information or the luminance conversion information based on the intension of the content producer.

17. The image processing apparatus according to claim 10,
wherein the selected points are representative of a luminance conversion function which is based on the intension of the content producer, in which a first line extending from a second point to a third point of the plurality of points has a first inclination and a second line extending from the third point to a fourth point of the plurality points has a second inclination, and in which the second inclination has a second gradient different from a first gradient of the first inclination in accordance with the intension of the content producer.

18. The image processing apparatus according to claim 17,
wherein the second gradient is greater or less than the first gradient.

19. An image processing method comprising:
information acquiring, by a processing device, to acquire luminance conversion information for conversion of content in a first dynamic range into content in a second dynamic range; and metadata generating, by the processing device, to generate metadata of content based on the luminance conversion information, in which the luminance conversion information is based on an intension of a content producer for use in display mapping to a display, in which the intension of the content producer is with respect to luminance conversion of given content in the first dynamic range into converted given content in the second dynamic range and indicates an extent luminance information is to be kept based on luminance conversion processing in a region of a predetermined level of luminance in the first dynamic range, in which the metadata describes the intension of the content producer in a one-dimensional table expressing a relationship of values of measurement of luminance levels before and after conversion from the first dynamic range into the second dynamic range at selected points, in which, in the one-dimensional table, for each of the selected points, a value of luminance level of the given content is expressed as a linear luminance value of the given content in the first dynamic range and a value of luminance level of the converted given content is expressed as a linear luminance value of the converted given content in the second dynamic range, in which a first point in the one-dimensional table describes a correspondence relationship of a peak linear luminance value of the given content in the first dynamic range with a peak linear luminance value of the converted given content in the second dynamic range, in which the display has a third dynamic range different from the first and second dynamic ranges, and a peak linear luminance value of the third dynamic range is other than the peak linear luminance value of the given content in the first dynamic range and the peak linear luminance value of the converted given content in the second dynamic range, and in which the display mapping to the display includes mapping of luminance values for the display at each of the selected points, based on a mathematical relationship among the peak linear luminance value of the content in the first dynamic range, the peak linear luminance value of the content in the second dynamic range and the peak linear luminance value of the third dynamic range.

* * * * *